Figure 1:
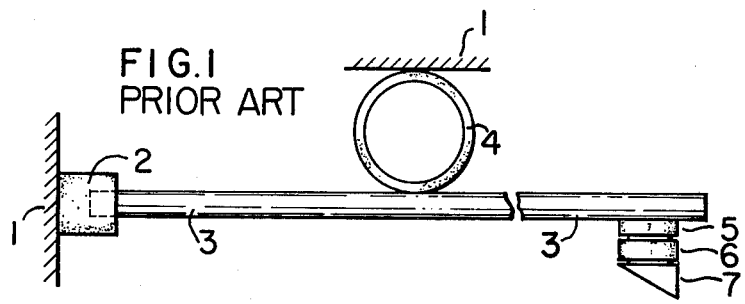

United States Patent [19]

Nagaoka

[11] 4,063,285
[45] Dec. 13, 1977

[54] PICKUP DEVICE WITH A COMPOSITE COMPLIANCE ARM

[75] Inventor: Tadashi Nagaoka, Nishinomiya, Japan

[73] Assignee: Matsushita Electric Industrial Co., Ltd., Osaka, Japan

[21] Appl. No.: 576,370

[22] Filed: May 12, 1975

[30] Foreign Application Priority Data

| May 15, 1974 | Japan | 49-54753 |
| May 23, 1974 | Japan | 49-58584 |
| May 24, 1974 | Japan | 49-59074 |
| May 24, 1974 | Japan | 49-59076 |
| Mar. 12, 1975 | Japan | 50-30528 |
| Mar. 12, 1975 | Japan | 50-34020[U] |

[51] Int. Cl.² ............... H04N 5/76; G11B 3/10
[52] U.S. Cl. ............... 358/128; 179/100.4 R; 179/100.41 P; 274/23 R
[58] Field of Search ........... 179/100.41 P, 100.41 R, 179/100.1 B, 100.4 R; 274/23 R, 23 A, 37; 178/6.6 DD; 358/128

[56] References Cited

U.S. PATENT DOCUMENTS 3,691,318  9/1972  Schuller et al. ............ 179/100.41 P Primary Examiner—Raymond F. Cardillo, Jr.
Attorney, Agent, or Firm—Stevens, Davis, Miller & Mosher

[57] ABSTRACT

A pickup device for a video disk for extracting a signal from an information record medium having a high frequency signal recorded thereon in the form of an uneven groove, wherein a scanning body comprising a signal extracting element for producing an electrical signal from the information record medium in accordance with the information therein and a reproducing needle is supported by a plurality of arms each having a lower resonance frequency than the frequency band of the reproduced signals, whereby the reproducing needle is kept in close contact with the information record medium irrespective of the movement of the latter to allow high fidelity reproduction of a wide band high frequency signal.

11 Claims, 22 Drawing Figures

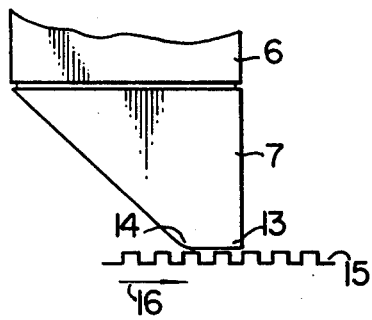
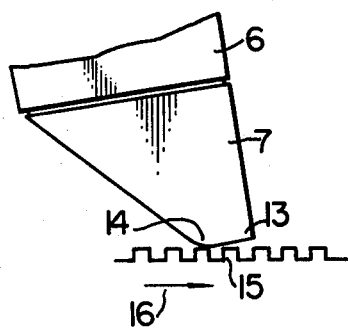
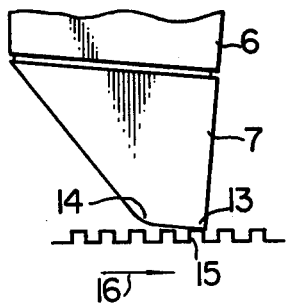

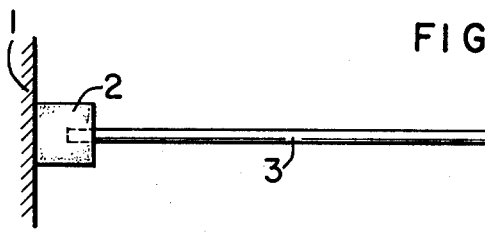
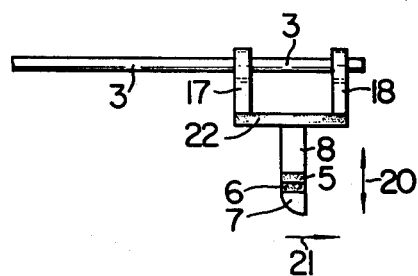
FIG.10
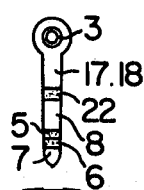
FIG.11
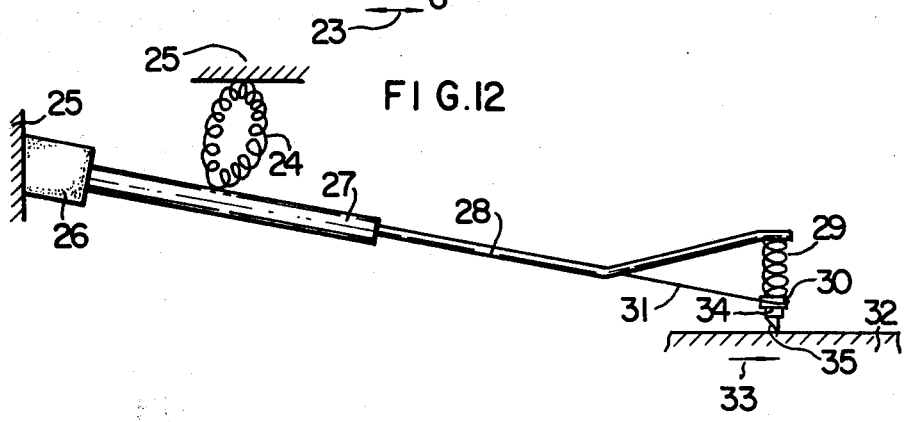
FIG.12
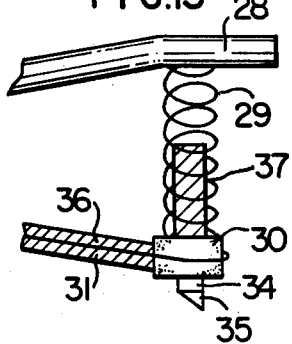
FIG.13
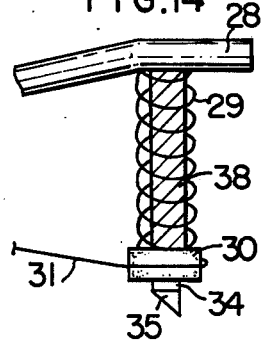
FIG.14

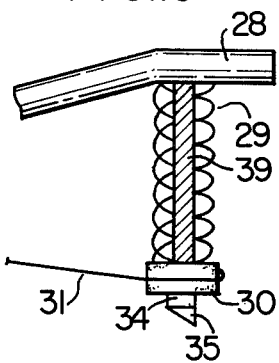
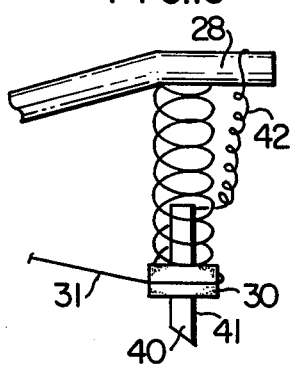
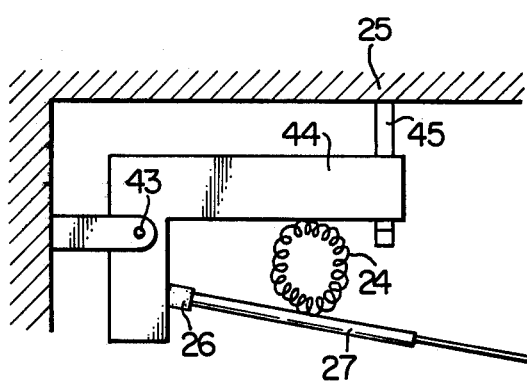
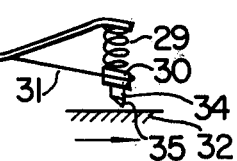
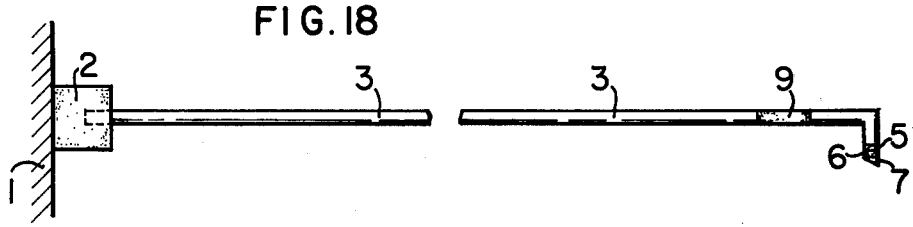
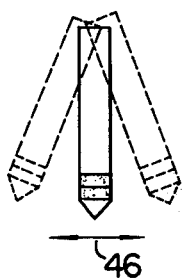

PICKUP DEVICE WITH A COMPOSITE COMPLIANCE ARM

The present invention relates to a pickup device for a so-called video disk apparatus which extracts signals from an information record medium having a high frequency signal of a wide band ranging over several MHz in a groove of the record medium.

In order to record and reproduce such a wide band of a high frequency signal it is necessary that the disk be rotated at a very high speed to attain a very high relative velocity between the recorded signal and a signal reproducing needle. In one example of the video disk system a flexible disk having a diameter of approximately 21 cm and a thickness of approximately 0.1 mm, having a signal recorded thereon, is rotated at 1500 r.p.m. while it is aerodynamically stabilized, and a piezoelectric type pickup device is pressed to the disk for reproducing a PAL system TV signal of about ten minutes length. An example of the piezoelectric type pickup device usable in such a video disk system is disclosed in U.S. Pat. No. 3,691,318. Where the information recording medium comprises a very thin sheet such as a vinyl sheet having an uneven groove formed thereon by an embossing method, the groove of the recording medium will be readily deformed by the needle pressure of the pickup device if the pickup device as disclosed in the above U.S. Patent is used. Further, although the record medium is floated by an air cushion and operates when contact with the reproducing needle of the pickup device is attained by a properly damped elasticity, a vertical vibration at high frequency, which is about 50 times higher than that encountered in an audio record disk, is generated when the rotating record medium includes some distortion. As a result, it is difficult to reproduce the recorded signal continuously with the above pickup device pressed under a low pressure, and the reproduced signal is partially interrupted resulting in noise in the reproduced video image and voice signal. In an improved form of the video disk type information record medium, the information is recorded in a disk similar to a so-called "LP" record disk; that is, a disk having a diameter of approximately 30 cm and a thickness of 2 mm, in the form of an uneven pattern on the bottom of a groove. Since this type of disc is formed by molding plastic resin by a pressing technique similar to that employed in the audio record disk, spurious unevenness and warp which are as great as those encountered in the audio record are included. Since the information record medium for the video disk thus molded should be rotated at a much higher rotating speed than the audio record disk, such as at 450 r.p.m., yet must offer correct reproduction of the recorded signal of 1 micron or less in length, it is necessary that the needle pressure be around 30 mg. Samll unevenness having a diameter of approximately 1 mm will be frequently formed during the formation of the information record medium. If such an unevenness occurs at a position on a circle having a diamter of approximately 25 cm, the frequency thereof corresponds to 5.8 KHz. Actual measurement of the unevenness in the information record disk has proved that it is distributed from a small amplitude unevenness at the above high frequency to 155 $\mu$ at the lowest frquency of 7.5 Hz, including 60 $\mu$ at 15 Hz, 30 $\mu$ at 30 Hz and 5 $\mu$ at 120 Hz. Thus, since the unevenness of a wide band ranging from 7.5 Hz to several KHz and the vertical vibration are included, it is very difficult under such a condition to continuously maintain the needle tip in contact with the uneven signal bearing groove with high fidelity while keeping the needle pressure of approximately 30 mg. Further, since there always exists dust on the information record medium, it is necessary to assure that the needle immediately moves back after it has jumped over the dust. While only the vertical movement of the information record medium has been discussed hereinabove, horizontal distortion can also be included. This distortion is a so-called eccentricity distortion which deviates from the center disk of a spiral groove and has a frequency of 7.5 Hz, for example. At a high frequency horizontal vibration mainly due to uneven localized shrinkage of the information record medium material, an unevenness of 1 $\mu$ occurs at a region of several tens of Hz.

Figure 3:
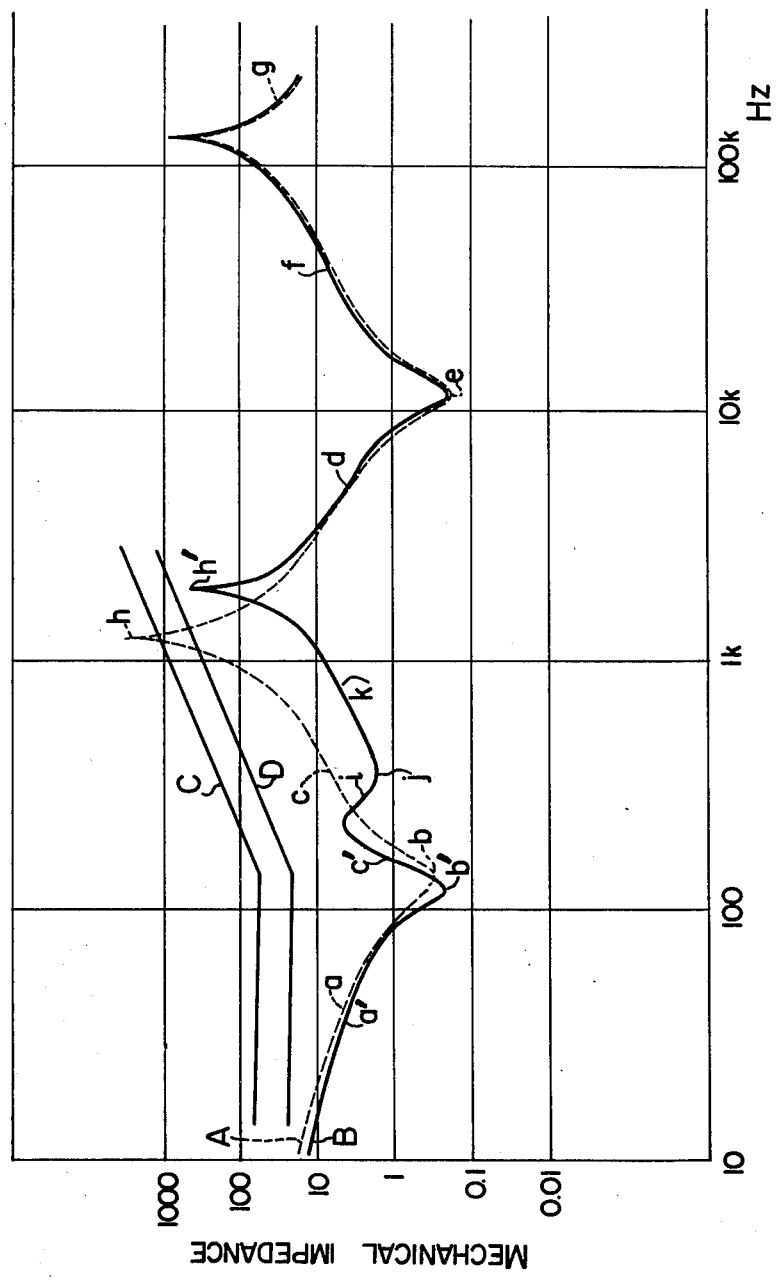

The mechanical impedance of the prior art system shown in FIG. 1 is now discussed. In FIG. 1, 1 designates a base on which a compliance arm 3 is mounted by a visco-elastic member 2. An intermediate portion is supported by a visco-elastic member 4 comprising a rubber ring. At an extreme end a piezoelectric element 6 is mounted through a cushion 5 of visco-elastic material for the piezoelectric element. A needle 7 is mounted on the piezoelectric element 6. The mechanical impedance of the pickup thus constructed is shown by a dotted line A in FIG. 3. Region $a$ is a stiffness region of the rubber ring. It may be considered that the elastic material 2, shown in FIG. 1, used at the root of the compliance arm serves as a support point and the affect thereof can be neglected. Region $b$ is a resonant point of the entire compliance arm and the rubber ring, region $c$ is a mass region of the entire complance arm, region $d$ is a stiffness region of the cushion for the piezoelectric element, region $e$ is a resonant point of the cushion for the piezoelectric element, the piezoelectric element and the needle, region $f$ is a mass region of the piezoelectric element, the cushion therefor and the needle, and region $g$ is a stiffness region of the information record medium. In FIG. 3, C represents an impedance which causes needle jump at a needle pressure of 50 mg and D represents the mechanical impedance of a needle pressure of 20 mg. It is thus seen that a crosspoint $h$ of the curve A exceeds the curve C at approximately 1.15 KHz and the pickup device shown in FIG. 1 exhibits needle jump even at the needle pressure of 50 mg. When the video disk as described above is used, a needle pressure of 30 mg or less is required to reproduce the recorded signal with high fidelity without distortion and the damage to the record medium will increase rapidly if a higher needle pressure is applied. Accordingly the pickup device of the above type cannot be used.

The present invention aims to overcome the above difficulties and it is, therefore, an object of the present invention to provide a video disk type video image reproducing system for reproducing a signal from a disk-shaped information record medium having a high frequency signal of a wide band ranging over several MHz recorded thereon in the form of an uneven groove wherein a pickup is provided which is capable of reproducing information from the shape of an uneven groove with high response irrespective of the movement of the information record medium; that is, the needle of the pickup device in maintained in close contact with the information record medium irrespective of the movement of the information record medium to attain high fidelity reproduction of an FM signal of several MHz.

It is another object of the present invention to improve the response by providing an elastic member at a junction between a cantilever and the compliance arm.

It is further object to improve the response by resiliently supporting a scanning body on the cantilever.

It is still another object to improve the response by providing a cantilever of a shape which renders the mechanical impedance of the pickup in the horizontal direction smaller than the mechanical impedance in the vertical direction.

It is further object to improve the response by improving the shape of the lead wire for the piezoelectric element.

Figure 2:
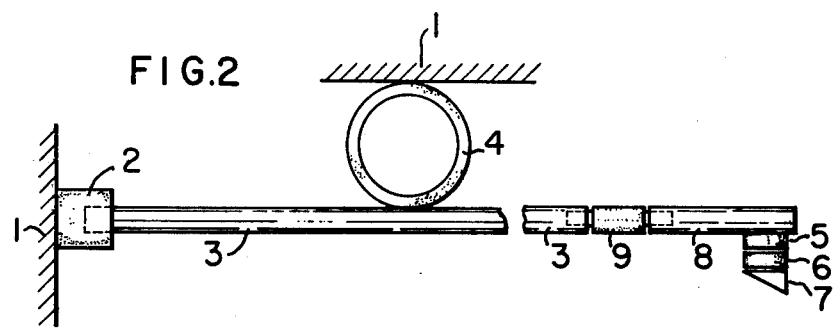
Figure 4:
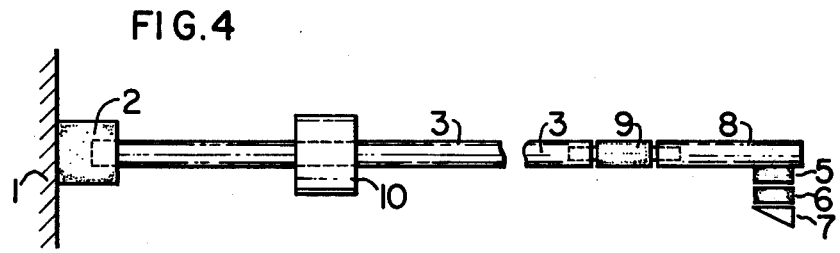
Figure 5:
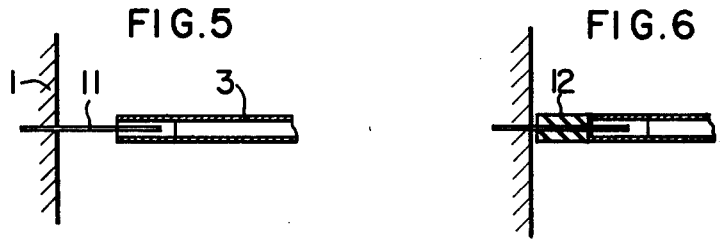
Figure 6:
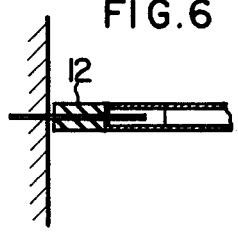
Figure 20:
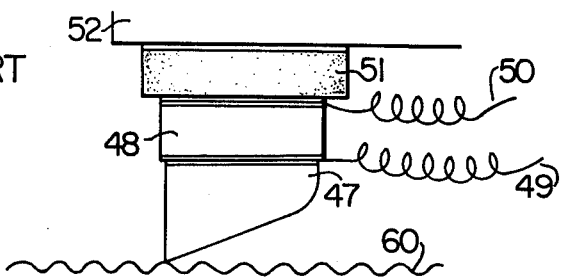
Figure 21:
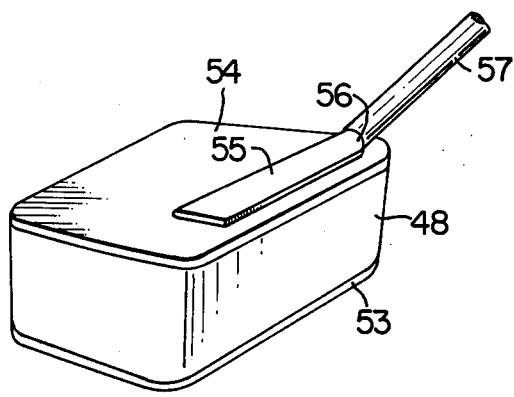
Figure 22:
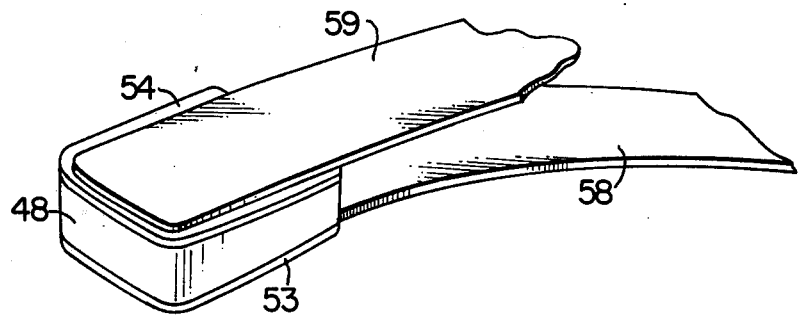

The above and other objects, features and advantages of the present invention will become more apparent from the following detailed description of the preferred embodiments of the present invention when taken in conjunction with the accompanying drawings, in which:

FIG. 1 shows a construction of a pickup device for a video disk in one example of the prior art system, FIG. 2 shows a construction of a pickup device for a video disk in accordance with one embodiment of the present invention, FIG. 3 shows characteristic curves of mechanical impedances of the pickup devices shown in FIGS. 1 and 2, FIG. 4 shows a construction in accordance with another embodiment of the present invention, FIGS. 5 and 6 show modifications of support for a compliance arm, FIGS. 7, 8 and 9 illustrate the contact state of a needle and an information record medium, FIGS. 10 and 11 show a structure to support a cantilever at two points, FIGS. 12 through 16 show modifications of the support which supports a support member of the piezoelectric element and the compliance arm to a base, FIG. 17 shows an improved modification of the support to the base shown in FIG. 12, FIGS. 18 and 19 illustrate the cantilever in its bent state, FIGS. 20 and 21 show a structure of an electrode of a prior art piezoelectric element, and FIG. 22 shows an improved modification of the structure shown in FIG. 20.

The preferred embodiments of the present invention will now be described in detail with reference to the accompanying drawings in which the same reference numbers are used to identify the parts common to those in the prior art illustration.

Referring to FIG. 2, a compliance arm 3 is divided and a cantilever 8 is coupled to an end of the compliance rm 3 through a connecting visco-elastic member 9. In one particular example of the construction, the compliance arm 3 is an aluminum alloy pipe having an outer diameter of 0.5 mm, an inner diameter of 0.4 mm and a length of 57 mm, and the cantilever 8 is made of the same material having a length of 3 mm. A rubber ring 4 is made having a rubber of hardness of 30°, a width of 1 mm, a thickness of 0.5 mm and a ring diameter of 9.5 mm. The connecting rubber 9 is made having a butyl rubber of hardness of 50°, a sectional area of 0.5 × 1 mm² and an effective length of 2 mm. A cushion for the piezoelectric element is made of butyl rubber of hardness of 40° having a sectional area of 0.5 × 0.5 mm², a thickness of 0.2 mm, and the piezoelectric element has a thickness of 0.13 mm and a size of 0.1 × 0.1 mm². A needle is made of diamond of modified tetrahedron having one edge length of about 0.1 mm. The mechanical impedance of the pickup device of the above construction is shown in FIG. 3 by a solid line B. More particularly, the portion $a'$ is a stiffness region of the rubber ring 4 and the connecting rubber 9, a portion $b'$ is the resonance point of the entire compliance arm, the rubber ring 4 and the connecting rubber 9, the portion $c'$ is the mass region of the entire compliance arm, the portion $i$ is a stiffness region of the connecting rubber 9, the portion $j$ is the resonance point of the connecting rubber 9 and the cantilever 8, the portion $k$ is the mass region of the cantilever beyond the connecting rubber, and the remaining portions represent the same regions as described above. It is seen from the observation of FIG. 3 that the pickup device in accordance with the present embodiment has a portion $h'$ which is located below the impedance level and that the needle jump occurs at 20 mg and hence it can reproduce a signal with high fidelity while continuously maintaining the needle in contact with the record medium without being affected by any vertical vibration caused by the information record medium.

Based on the principle derived from the above embodiment of the present invention, the following modifications may be practiced. Referring to FIG. 4, a modification is illustrated wherein the rubber ring has been removed and instead a weight 10 for loading a proper needle pressure is attached to the compliance arm. As an alternative, neither the rubber ring nor the weight 10 is used but the needle pressure may be applied by the elastic member 2 such as rubber at the root to attain a successful result. The elastic member 2 may be formed by a piano wire 11 as shown in FIG. 5 or an outer periphery thereof may be covered with elastic material 12 as shown in FIG. 6, to obtain a successful result. Further, the structures shown in FIGS. 5 and 6 may be employed between the compliance arm 3 and the cantilever 9 to obtain a successful result.

With the pickup device of the construction described above, the compliance arm 3 moves up and down around the elastic member 2 at the root at a low frequency of the vertical movement in the plane of the disc, but at a higher frequency the cantilever 8 moves up and down around the connecting elastic member 9 which now serves as a bending center. FIGS. 7 through 9 show the various states. FIG. 7 illustrates, in enlarged scale, the contact point between the needle and the disk in a normal state. In the figure, the needle 7 joined at the end of the piezoelectric element 6 abuts against the information record medium from the front end 13 to the rear end 14. The disk rotates in the direction of the arrow 16. When the end of the cantilever is pushed upwardly, the contact between the needle and the information record medium changes to the state shown in FIG. 8 wherein the needle 7 contacts the record medium only at the round corner 14. This results in the reduction of a high frequency signal and the output voltage decreases. When the cantilever bends downwardly the contact of the needle 7 and the information record medium 15 changes to a state shown in FIG. 9 wherein the needle 7 abuts against the information record medium 15 only at its tip end 13. This results in an increase in the signal output but also results in rapid wear of the tip end. Further, in the case of FIG. 8, since the needle 7 abuts against more than one adjacent uneven areas, signals of different phases may be reproduced. This will cause a shift in color phase or tint if a color signal is recorded with phase modulation. Furthermore, since the mass beyond the connecting elastic member 9 is large, the needle follows the vertical and lateral movements of the information record medium at high frequency only with difficulty.

A modified embodiment which overcomes the above inconveniences will now be described. Referring to FIG. 10, posts 17 and 18 axially mounted at the end of the compliance arm 3 support a cantilever mount 22 which supports the cantilever 8, and the cushion 5 for the piezoelectric element, the piezoelectric element 6 and the needle 7 being mounted at the end of the cantilever. The cantilever mount 22 is made of elastic material and serves in the same way as the connecting elastic member 9. It may be formed integrally with the posts 17 and 18 to attain a successful result. It may be formed of resilient material such as piano wire or an outer periphery thereof may be coated with elastic material. With the illustrated structure, the cantilever is stable in the direction of travel (arrow 21) of the groove of the information record medium and it can readily follow the vertical movement (arrow 20) of the information record member without accompanying substantial change in the needle angle. Since the length from the root of the cantilever 8 to the tip end of the needle, the structure exhibits a very excellent response even in a horizontal direction (arrow 23) which is perpendicular to the direction of travel of the record groove, as shown in FIG. 11.

FIG. 12 illustrates another embodiment of the present invention in which a first arm 27 is supported on a base 25 by an elastic member 26. In FIG. 12, the first arm 27 may be an aluminum pipe having an outer diameter of 0.8 mm and a length of about 36 mm, one end of which is secured to the base 25 through the elastic member 26 such that it inclines by a predetermined angle with respect to the information record medium 32. 28 designates a second arm having its one end connected to the first arm 27 and may be an aluminum pipe having an outer diameter of 0.4 mm and a length of about 32 mm, an end of which is bent upwardly with respect to the information record medium 32.

At the end of the second arm 28 there is mounted a coiled spring 29 formed of Be-Cu, stainless steel or piano wire of about 0.1 mm diameter substantially perpendicular to the information record medium 32, and at an end of the coiled spring 29 a cushion 30 for the piezoelectric element is secured. 31 designates a stay formed of similar wire material as that of the coiled spring 29 and it defines the travel position of the cushion 30 for the piezoelectric element in the direction of an arrow 33 (the direction of travel of the disk).

Below the cushion 30 for the piezoelectric element a needle 35 is supported through the piezoelectric element 34. The needle 35 is in contact with the information record medium 32. The first arm 27 is also supported on the base 25 by a ring-shaped coiled spring 24, the entire arm being supported under a stiffness of around 30 mg/mm in the direction perpendicular to the disc surface and a stiffness of around 20 mg/mm in the direction normal to the plane of FIG. 12, that is, the direction which is horizontally perpendicular to the longitudinal direction of the disk groove. The ring-shaped coiled spring 24 is formed of piano wire of 0.1 mm diameter wound to present an outer diameter of about 1.2 mm at about 0.4 mm pitch, which are then joined with each other to form a ring having an outer diameter of 10 mm, or it may be a ring of visco-elastic material. The latter may be damped by further being coated with silicone grease or elastic material to attain a successful result. The elastic material 26 such as rubber which joins the first arm 27 to the base may be butyl rubber having a hardness of 30° and serves as a support point to allow the entire arm to move freely in the vertical and lateral directions. The stiffness in the region from the second arm 28 to the tip end thereof is several hundreds to several thousands mg/mm in the vertical and horizontal directions and the stiffness at the tip end in a triangular region in the figure, in the horizontal direction also lies in the above range while the stiffness in the vertical direction is ten times as high as the above range. In the illustrated system, a satisfactory result is obtained when the vertical stiffness of the tip end of the scanning body in the frequency range of 100 Hz to several thousands Hz is larger than that in the lateral direction. According to the features of the present system, since the vertical movement of the needle is not substantially governed by the stay 31 but governed by the coiled spring 29, an ideal vertical movement can be attained. In addition, since the mass of vertical and lateral movements at high frequency vibration are very small an optimum tracking can be attained and effective damping of the tip end can be performed. In a system shown in FIG. 13, the cushion 30 for the piezoelectric element has a light member 37 such as an aluminum pipe attached thereto, an outer diameter of which is substantially equal to an inner diameter of the coiled spring 29, and silicone grease or the like is applied therebetween to present proper damping. It also serves to restrict the movement of the needle to a vertical direction and prevent the lateral movement from being driven excessively. FIG. 14 shows a modification in which the elastic member 38 is inserted in the coiled spring 29. This modification offers an excellent damping effect. Experiments by the inventors proved that a satisfactory result was obtainable even when the coiled spring was removed and the visco-elasticity material 38 only was used. FIG. 15 shows another embodiment in which a strip 39 of elastic material is applied on a portion of an outer periphery of the coiled spring 29. It may be entirely covered by a pipe-shaped member. It has also been proved that the present invention can be applied to a so-called capacitance type video disk to attain a successful result. In such a type of video disk, the scanning body is made of a long, hard material such as 40 in FIG. 16 and bears an electrode 41 at a portion thereof. Therefore, the scanning body may extend through the cushion 30, and the electrode may either be connected to the second lever via a lead 42 or it may be directly connected to an electric circuit.

With the above construction according to the present invention, the scanning body (reproducing needle) can be moved in a transverse direction to the disk plane and hence the inconveniences encountered in the prior art system can be overcome.

FIG. 17 illustrates an improvement over the structure shown in FIG. 12 in which the first arm 27 is fixed to an L-shaped member 44 movably mounted to the base by a pin 43 through the resilient member 26. 45 designates a member which defines a maximum pivot position of the member 44. With this arrangement, a low frequency variation due to distortion, such as warp of the disk is absorbed by vertical movement of the entire pickup including the member 44. The variation at higher frequency can be effectively absorbed, to the extent of very high frequencies, in the order of the compression of the elastic member 24 such as the coiled spring, the flexures of the first arm 27 and the second arm 28, the compression of the coiled spring 29 and the cushion 30.

In any of the above embodiments, the compliance to the horizontal movement of the disk groove is determined mostly by the shape of the connecting elastic member. The mechanical impedance to the horizontal movement at relatively high frequency is determined by the mass of the cantilever and the horizontal movement. On the other hand, in the embodiments shown in FIGS. 18 and 19, the cantilever is structured in an L-shape to present a rotational moment to the horizontal movement of the information record medium or the disk. The length from the horizontal portion of the cantilever to the tip end of the needle is 1.5 mm, for example, which is about twice as long as the previous example taking the horizontal portion of the cantilever as an axis. It is seen from FIG. 19 which shows an elevational view of FIG. 18 that the tracking to the horizontal movement 46 of the disk can be attained mainly by the tilting of the vertical portion of the cantilever rather than by the lateral movement of the horizontal portion. It is apparent that an equivalent mass of the cantilever in the horizontal direction which effects the mechanical impedance decreases and a satisfactory response to the horizontal vibration is attained, which permits satisfactory tracking up to a high frequency.

It should be understood that the structures described above can be combined to construct a system which satisfies the objects of the present invention.

In any of the above embodiments, the piezoelectric element is structured as shown in FIGS. 20 and 21. The needle 47 of hard material such as diamond or saphire which abuts against the information record medium 60 is directly coupled to the piezoelectric element 48 by bonding material. An electrical signal generated by the piezoelectric element 48 is passed to an amplifier by conductors 49 and 50. The piezoelectric element 48 is coupled to the cantilever 52 through a damper 51 made of elastic material such as rubber.

One of the difficulties encountered in manufacturing a pickup of this type is the outlet arrangement of conductors from the piezoelectric element. In the case of a piezoelectric pickup device for an audio record disk, the piezoelectric element is large in size, and the needle and the cantilever are discrete components, and they are coupled to the piezoelectric element by an armature. As a result a sufficiently large space is available for taking out the conductors. In the pickup for the video disk, however, substantially the entire area of the underside of the piezoelectric element 48 is occupied by the needle 47 as seen from FIG. 20 and the entire area of the upperside of the piezoelectric element 48 is supported close to an elastic material 51 which serves as a damper. Thus, the needle is mounted eccentrically to the piezoelectric element, and the conductors are fixed at one end of the piezoelectric element, and on the other side of the piezoelectric element (which faces the damper 51) the damper is formed with slots in which conductors are accomodated. As a result, the needle deviates from the center of the piezoelectric element so that when pressure is applied to the tip end of the needle pressure is applied to a point which is shifted from the center of the pickup, resulting in a torsional force which twists the entire pickup device, and hence the operation is unstable. Further, weight loading at a point other than the center of the piezoelectric element is not desirable because the resonance characteristic is changed. Furthermore the conductors for a face-up electrode require a troublesome process to form small slot in the damper in order to accomodate the conductors. In addition, in this system, since the conductors are joined to the electrode in cylindrical shape, the junction area with the piezoelectric element is small and hence the bonding force is small resulting in the stopping off of the conductors by ultrasonic vibration of the piezoelectric vibration. When the conductors are soldered to increase the junction area, the mass of the solder additionally loads the piezoelectric element.

As an approach to overcome the above drawback a method illustrated in FIG. 21 is proposed. When the conductor 57 is to be joined to the electrode 54 or 53 of the piezoelectric element 48, a gold wire 15 $\mu$m diameter is used and a tip end 55 thereof is flattened by an ultrasonic bonding apparatus, which end is then press-contacted to the electrode 54. By this method the junction area can be increased but the root portion 56, that is, the transition point of the gold wire from a circular section to a rectangular section is apt to be broken and the needle does not lie at the center of the piezoelectric element. Although it may be considered that the above difficulty can be avoided by using a gold wire of larger diameter and flattening it to cover the entire surface of the piezoelectric element it is impossible to compress the gold wire into a uniform thickness and if possible a high pressure which readily changes the property of the piezoelectric element is required and hence the wire is apt to be broken.

An improved pickup device over the above prior art apparatus is described below. Referring to FIG. 22, the piezoelectric element 48 is of the shape having a thickness of 0.13 mm, a width of 0.15 mm and a length of 0.15 mm, and is provided with electrodes 53 and 54. Gold foils 58 and 59 each having a width of 0.15 mm and a thickness of 5 $\mu$m are ultrasonic bonded to the electrodes 53 and 54. Since the gold foils are very readily press-contacted to the electrodes yielding a large junction area and a smooth upper surface, they are easy to manufacture and exhibit a good characteristic. The flexibility of the gold foil having a width of 0.15 mm and a thickness of 5 $\mu$m is twice as high as that for a gold wire having a 0.015 mm diameter. If a gold foil having the same width and a thickness of 2.5 $\mu$ is used the flexibility is four times as high as that of the above wire. On the other hand, the weight of the conductor which constitutes a load to the ultrasonic vibration of the piezoelectric element, for the gold foil of 0.15 mm length and 2.5 $\mu$m thickness is only twice as much as that of the gold wire having the 15 $\mu$m diameter, creating no serious problem. Rather it brings about advantageous results because the weight of the gold foil is applied to the entire surface of the piezoelectric element. The conductor material of the above structure is not only ideal as a conductor wire for the piezoelectric element but also it is advantageous to the movement of the cantilever because of its high bending flexibility. In addition, the occurence of breakage of the wire due to vibration is greatly reduced.

Although the gold foil was used in the above embodiment it is contemplated as modifications of the present invention to use a gold foil which is most compatible, at the junction with the piezoelectric element and connect a foil of more flexible and stronger material such as beryllium at an end thereof, or to use a gold foil for the connection to the piezoelectric element and a conventional conductor for the connection to a preamplifier when the vibration amplitude of the cantilever is small, or to use a gold foil between the conductor and the preamplifier to facilitate the vibration of the cantilever when the piezoelectric element is of sufficient size or structure to permit the connection of the conductor.

What is claimed is:

1. A signal reproducing device for use with a uniformly rigid record medium formed with a guide groove having an uneven pattern formed on at least the bottom thereof with projections of the signal segment being located at intervals corresponding to a modulated recorded signal having a predetermined frequency band, said device comprising:

a base, a pickup member for engaging said record medium, and a composite compliance arm having at least three arm sections, one of said arm sections being supported at one end by said base and another of said arm sections having said pickup member secured thereto, each of said arm sections having a resonant frequency which is lower than the lowest frequency in said predetermined frequency band, the mechanical impedance of said composite compliance arm being less than the impedance which causes said pickup member to jump out of engagement with said signal recording medium when a predetermined pressure is applied thereto.

2. A signal reproducing device as defined by claim 1 wherein said composite compliance arm comprises first, second and third arm sections, said first section being supported by said base, said third section having said pickup arm secured thereto and being parallel to said record medium and said second section coupling to said first and third sections.

3. A signal reproducing device as defined by claim 2 which further comprises a cantilever member interposed between said pickup member and said third arm section.

4. A signal reproducing device as defined by claim 2 wherein said second arm section is substantially perpendicular to said first and third arm sections.

5. A signal reproducing device as defined by claim 4 wherein said second arm section comprises first and second spaced apart members coupling said first and third arm sections.

6. A signal reproducing device as defined by claim 1 wherein said composite compliance arm comprises first, second and third arm sections, said first section being supported by said base, said third section being a coiled spring substantially perpendicular to said record medium and said second section coupling said first and third sections.

7. A signal reproducing device as defined by claim 6 which further comprises a wire stay connecting said second arm section to said pickup member.

8. A signal reproducing device as defined by claim 6 which further comprises a pipe member positioned within said coiled spring, said pipe member being affixed to said pickup member and slidably contacting the inner surface of said coiled spring.

9. A signal reproducing device as defined by claim 6 which further comprises an elastic member coupling said second arm section and said pickup member.

10. A signal reproducing device as defined by claim 6 wherein said pickup member comprises a scanning body having an electrode on a portion thereon, said electrode being provided with a lead for connection to an external circuit.

11. A signal reproducing device as defined by claim 1 wherein said pickup member comprises a needle and a piezoelectric element for supporting said needle, said piezoelectric element having first and second electrodes on opposite surfaces thereof, said pickup member further comprising first and second conductive foils secured to at least a portion of the surfaces of said first and second electrodes respectively.

* * * * *